United States Patent
Gim

(10) Patent No.: US 12,204,405 B2
(45) Date of Patent: Jan. 21, 2025

(54) STORAGE DEVICE DETERMINING QUICKLY WHETHER ERROR CORRECTION DECODING HAS FAILED AND METHOD OF OPERATING THE STORAGE DEVICE

(71) Applicant: SK hynix Inc., Icheon-si (KR)

(72) Inventor: Yeong Dong Gim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 46 days.

(21) Appl. No.: 18/309,806

(22) Filed: Apr. 30, 2023

(65) Prior Publication Data
US 2024/0193040 A1   Jun. 13, 2024

(30) Foreign Application Priority Data
Dec. 8, 2022   (KR) .................. 10-2022-0170183

(51) Int. Cl.
G06F 11/10   (2006.01)

(52) U.S. Cl.
CPC ...... *G06F 11/1048* (2013.01); *G06F 11/1072* (2013.01)

(58) Field of Classification Search
CPC ............ G06F 11/1048; G06F 11/1072; G06F 11/1012
See application file for complete search history.

(56) References Cited

U.S. PATENT DOCUMENTS

| 9,954,558 | B1 * | 4/2018 | Steiner | ................ G11C 11/5642 |
| 11,876,535 | B1 * | 1/2024 | Kuo | ................ H03M 13/3707 |
| 2015/0121128 | A1 | 4/2015 | Li | |
| 2019/0278653 | A1 | 9/2019 | Padilla, Jr. et al. | |
| 2020/0373944 | A1 * | 11/2020 | Cho | ................ G06F 11/1048 |
| 2020/0403642 | A1 * | 12/2020 | Zhang | ................ H03M 13/1128 |

FOREIGN PATENT DOCUMENTS

KR   10-2015-0019410   2/2015

OTHER PUBLICATIONS

J. Li, G. He, H. Hou, Z. Zhang and J. Ma, "Memory efficient layered decoder design with early termination for LDPC codes," 2011 IEEE International Symposium of Circuits and Systems (ISCAS), Rio de Janeiro, Brazil, 2011, pp. 2697-2700 (Year: 2011).*

* cited by examiner

*Primary Examiner* — Cynthia Britt

(57) ABSTRACT

A storage device may execute first error correction decoding on a plurality of memory cells when a read operation on the plurality of memory cells fails, and determine, when the first error correction decoding fails, whether to execute second error correction decoding on the plurality of memory cells based on at least one of a value of an early termination flag and whether an early termination condition is satisfied.

13 Claims, 8 Drawing Sheets executing first error correction decoding on the plurality of memory cells — S810 determining at least one of the value of the early termination flag and whether the early termination condition is satisfied when the first error correction decoding fails — S820 determining whether to execute second error correction decoding based on at least one of the value of the early termination flag and whether the early termination condition is satisfied when the first error correction decoding fails — S830

STORAGE DEVICE DETERMINING QUICKLY WHETHER ERROR CORRECTION DECODING HAS FAILED AND METHOD OF OPERATING THE STORAGE DEVICE

CROSS-REFERENCES TO RELATED APPLICATION

The present application claims priority under 35 U.S.C. § 119(a) to Korean patent application number 10-2022-0170183 filed in the Korean Intellectual Property Office on Dec. 8, 2022, which is incorporated herein by reference in its entirety.

BACKGROUND

1. Technical Field

Various embodiments generally relate to a storage device with improvements in the speed of determining whether error correction decoding has failed and methods of operating the storage device.

2. Related Art

A storage device is a device that stores data according to a request from an external device such as a computer, a mobile terminal such as a smartphone or a tablet, or various electronic devices.

The storage device may include a controller for controlling a memory (e.g., a volatile memory or a nonvolatile memory) included in the storage device. The controller may receive a command from the external device, and may execute or control an operation for reading, writing or erasing data with respect to the memory, consistent with the received command.

When a failure occurs when the storage device reads data from the memory, the storage device may execute error correction decoding to obtain original data from the failed data.

SUMMARY

Various embodiments are directed to a storage device capable of avoiding the problem of increased latency of read operation in situations where uncorrectable errors occur frequently, and methods of operating the storage device.

In an embodiment, a storage device may include: i) a memory including a plurality of memory cells, and ii) a controller configured to execute first error correction decoding on the plurality of memory cells when a read operation on the plurality of memory cells fails, determine, when the first error correction decoding fails, whether to execute second error correction decoding on the plurality of memory cells based on at least one of a value of an early termination flag and whether an early termination condition is satisfied.

In an embodiment, a method for operating a storage device may include: i) executing first error correction decoding on a plurality of memory cells when a read operation on the plurality of memory cells fails, ii) determining at least one of a value of an early termination flag and whether an early termination condition is satisfied when the first error correction decoding fails, and iii) determining whether to execute second error correction decoding on the plurality of memory cells based on at least one of the value of the early termination flag and whether the early termination condition is satisfied.

In an embodiment, a controller may include: i) a memory interface capable of communicating with a memory including a plurality of memory cells, and ii) a control circuit configured to execute hard decision decoding on the plurality of memory cells when a read operation on the plurality of memory cells fails, execute soft decision decoding on the plurality of memory cells or determining that an uncorrectable error has occurred when the hard decision decoding fails, and reset an early termination flag when the hard decision decoding succeeds or the soft decision decoding succeeds.

According to embodiments of the disclosure, it is possible to avoid the problem of increased latency of read operation in situations where uncorrectable errors occur frequently.

DETAIL DESCRIPTION

Figure 1:
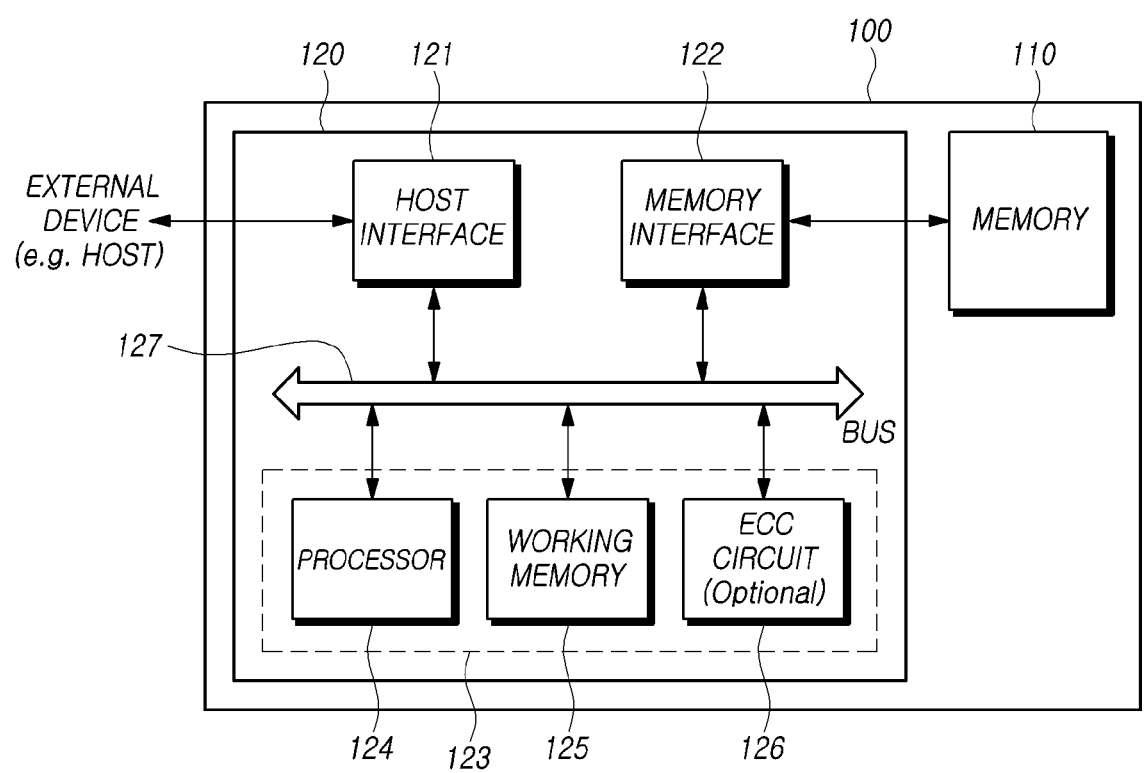
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data, and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells"), which store data. Such a memory cell array may exist in a memory block.

For example, the memory 110 may be implemented into various memory types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of traveling under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an SMBus (system management bus) protocol, an I2C (inter-integrated circuit) protocol, an I3C (improved inter-integrated circuit) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 as a storage device from the host and transfer the command to the flash translation layer (FTL); and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110 but is not loaded in the working memory 125, the processor 124 may generate an event (e.g., an interrupt) for loading the corresponding part of the firmware into the working memory 125 from the memory 110.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is operating. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using an error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not by units of sectors. For example, when a bit error rate (BER) is higher than a set reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect an uncorrectable sector. There may be one or more sectors that are determined to be uncorrectable. The error detection and correction circuit 126 may transfer information (for example, address information) regarding a sector that is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
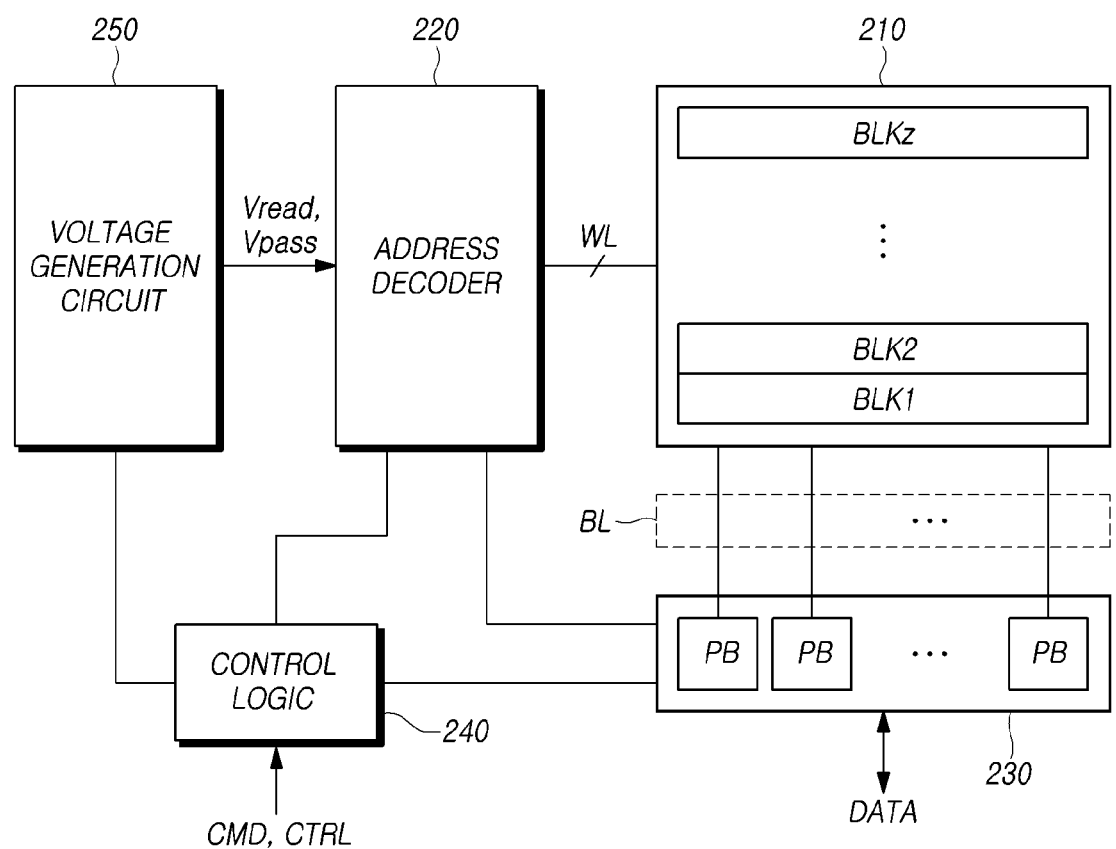
FIG. 2 is a block diagram schematically illustrating a memory of FIG. 1.

FIG. 2 is a diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block in a read voltage applying operation. The address decoder 220 may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line WL depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
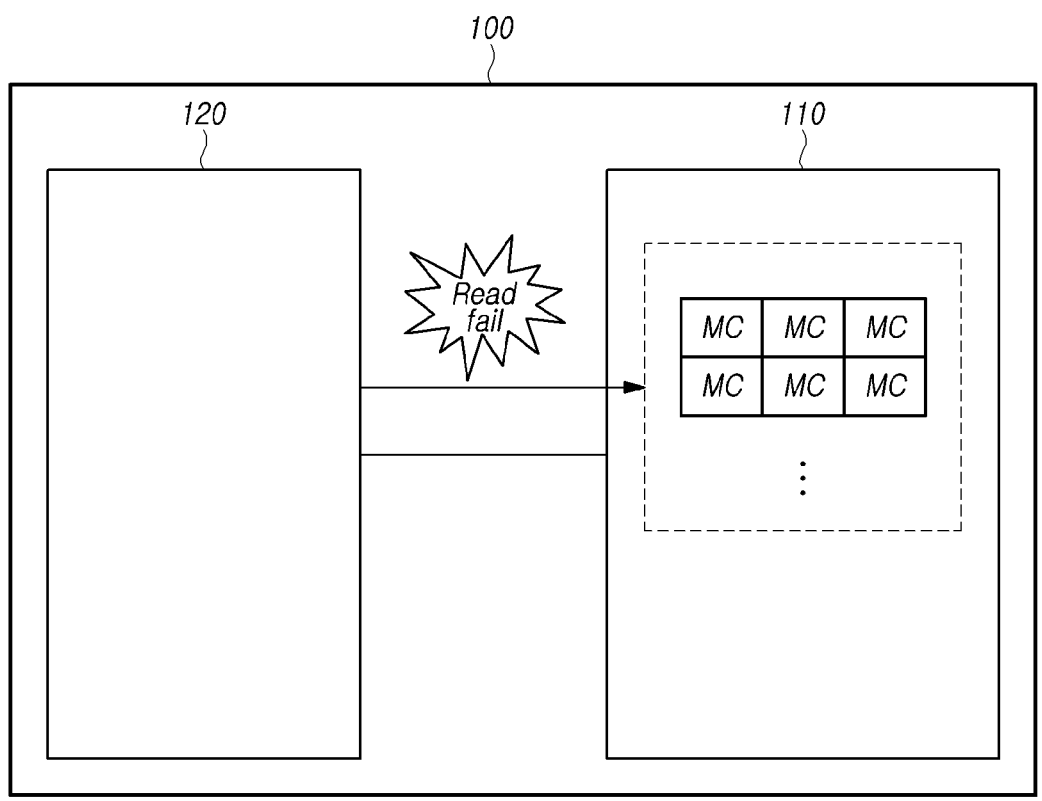
FIG. 3 is a diagram illustrating a storage device executing a read operation on a plurality of memory cells, according to an embodiment of the disclosure.

FIG. 3 is a diagram illustrating a storage device executing a read operation on a plurality of memory cells, according to an embodiment of the disclosure.

Referring to FIG. 3, a storage device 100 may include a memory 110 and a controller 120.

The memory 110 may include a plurality of memory cells MC. Each of the plurality of memory cells MC may store data of one bit or more.

The controller 120 may execute a read operation on the plurality of memory cells MC.

As illustrated in FIG. 3, the read operation on the plurality of memory cells MC may fail. This means that it is necessary to correct errors that have occurred in data read from the plurality of memory cells MC.

Hereinafter, an operation executed by the storage device 100 when the read operation on the plurality of memory cells MC fails will be described in detail.

Figure 4:
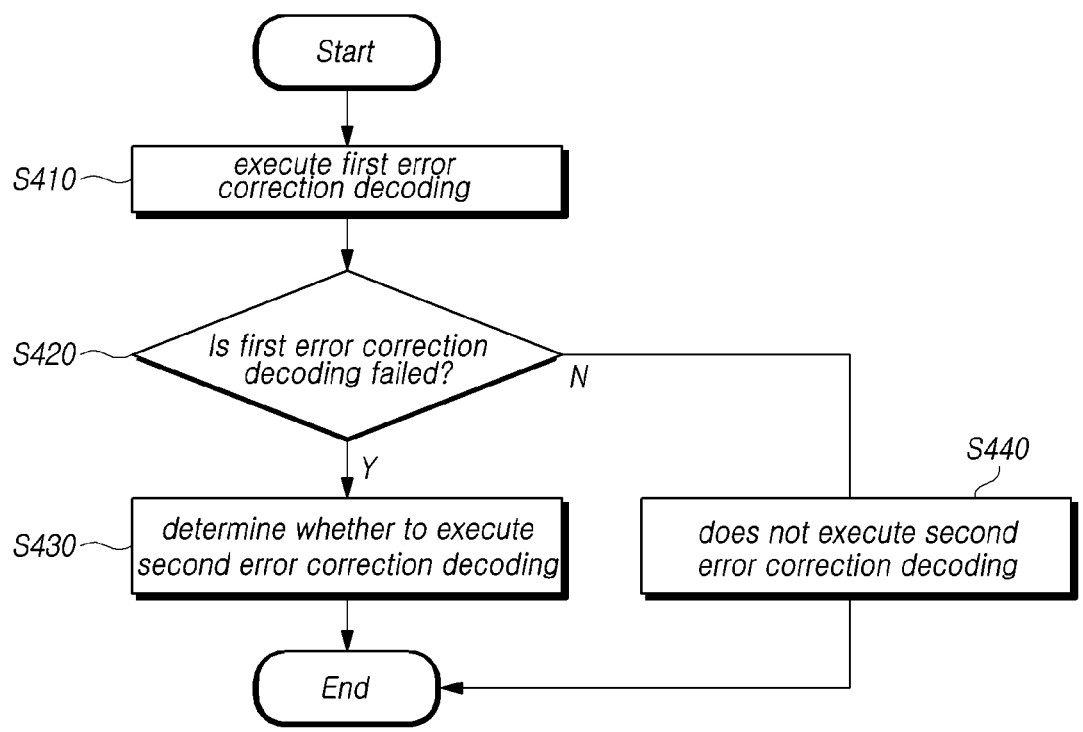
FIG. 4 is a flowchart illustrating an operation executed by a storage device when a read operation on a plurality of memory cells fails, according to an embodiment of the disclosure.

FIG. 4 is a flowchart illustrating an operation executed by a storage device when a read operation on a plurality of memory cells fails, according to an embodiment of the disclosure.

Referring to FIG. 4, a controller 120 of a storage device 100 may execute first error correction decoding on a plurality of memory cells MC when a read operation on the plurality of memory cells MC fails (S410). When the first error correction decoding is successful, the controller 120 may correct errors that have occurred in data read from the plurality of memory cells MC and generate original data.

The controller 120 may determine whether the first error correction decoding executed in the operation S410 has failed (S420).

When the first error correction decoding fails (S420-Y), the controller 120 may determine whether to execute second error correction decoding on the plurality of memory cells MC (S430). An operation executed by the controller 120 in the operation S430 will be described in detail with reference to FIG. 5.

On the other hand, when the first error correction decoding succeeds (S420-N), the controller 120 does not execute the second error correction decoding on the plurality of memory cells MC (S440). This is because the controller 120 has already generated original data through the first error correction decoding.

The aforementioned first error correction decoding may be hard decision decoding based on first data read from the plurality of memory cells, and the aforementioned second error correction decoding may be soft decision decoding based on the first data and probability information on the first data.

For example, when the controller 120 executes the first error correction decoding, the controller 120 may determine an optimal read voltage based on the threshold voltage distribution of the plurality of memory cells MC. Also, the controller 120 may read the first data from the plurality of memory cells MC based on the optimal read volage.

The controller 120 may determine the number of error bits in the first data. In this case, the controller 120 may use Bose, Chaudhri, Hocquenghem (BCH) code, Reed Solomon (RS) code, Reed Muller (RM) code, or Hamming code, but embodiments of the disclosure are not limited to these codes.

The controller 120 may determine whether an operation result of the first data and a parity check matrix is a zero matrix in order to determine the number of error bits in the first data.

If the number of error bits in the first data exceeds maximum correctable number of bits, then the controller 120 may determine that the first error correction decoding has failed. On the other hand, if the number of error bits in the first data is less than or equal to the maximum correctable number of bits, the controller may determine that the first error correction decoding is successful because the controller 120 can recover original data from the first data.

When the controller 120 executes the second error correction decoding, the controller 120 may determine whether the original data can be recovered based on the first data and probability information on the first data. In an example, the probability information may be a log likelihood ratio (LLR).

The probability information on the first data may be data obtained by reading the plurality of memory cells MC based on a read voltage different from the aforementioned optimal read voltage.

The controller 120 may determine the number of error bits in result data based on the first data and the probability information on the first data. For example, Low Density Parity Check (LDPC) code or convolution code may be used, but embodiments are not limited to the use of LDPC or convolution code.

If the number of error bits in the result data based on the first data and probability information on the first data exceeds a maximum correctable number of bits, then the controller 120 may determine that the second error correction decoding has failed. On the other hand, if the number of error bits in the result data based on the first data and probability information on the first data is equal to or less than the maximum correctable number of bits, then the controller 120 may determine that the second error correction decoding is successful.

In the embodiments of the disclosure, the first error correction decoding and the second error correction decoding are not limited to any specific decoding method, and decoding methods may be selected from among various known decoding methods.

The above-described first error correction decoding and second error correction decoding may be executed by the processor 124 or the error detection and correction circuit 126 described in FIG. 1.

Figure 5:
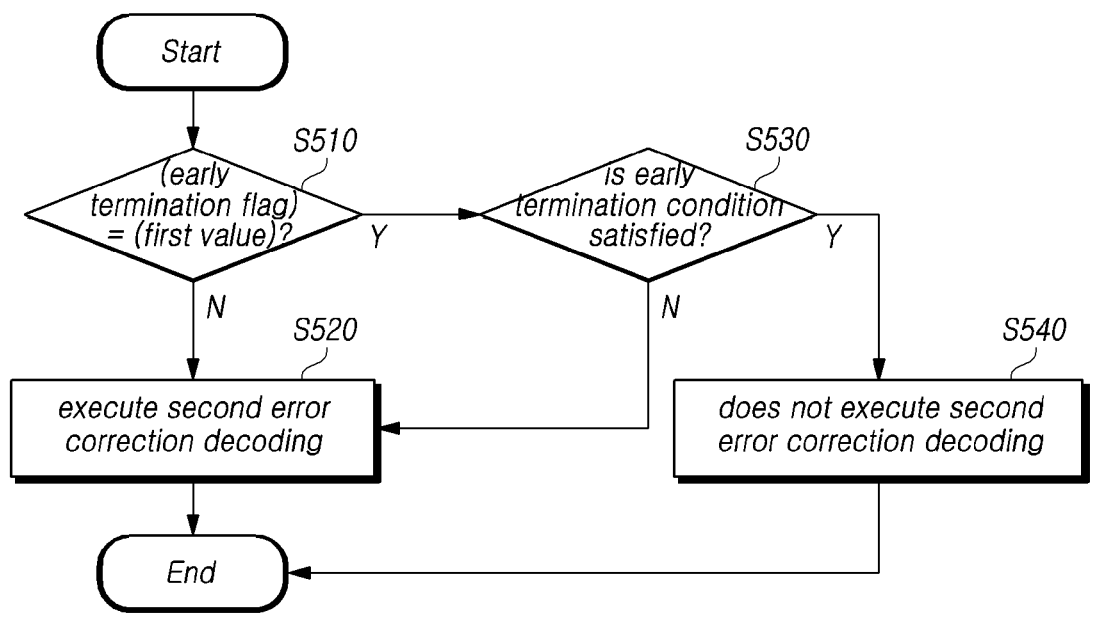
FIG. 5 is a flowchart illustrating an operation in which a storage device determines whether to execute a second error correction decoding, according to an embodiment of the disclosure.

FIG. 5 is a flowchart illustrating an operation in which a storage device determines whether to execute a second error correction decoding, according to an embodiment of the disclosure.

In embodiments of the present disclosure, a controller 120 of a storage device 100 may determine whether to execute a second error correction decoding on a plurality of memory cells MC based on at least one of (i) a value of an early termination flag and (ii) whether or not a set early termination condition is satisfied. That is, when the first error correction decoding fails, the controller 120 may determine, through an additional method, whether to execute the second error correction decoding or whether an uncorrectable error has occurred without executing further error correction decoding.

First, the controller 120 determines whether the early termination flag is a first value (e.g. 1) (S510).

The early termination flag is a flag used by the controller 120 to determine whether to terminate an error correction operation instead of executing the second error correction decoding on the plurality of memory cells MC.

For example, the early termination flag may have a first value (e.g., 1) or a second value (e.g., 0) In embodiments of the present disclosure, the early termination flag having the first value may mean that the early termination flag is set, and the early termination flag having the second value may mean that the early termination flag has been reset.

When the early termination flag is not the first value (S510-N), the controller 120 may execute the second error correction decoding on the plurality of memory cells MC (S520).

On the other hand, when the early termination flag is the first value (S510-Y), the controller 120 may determine whether the early termination condition is satisfied (S530).

The early termination condition is a condition that the controller 120 must satisfy in order to determine that an uncorrectable ECC (UECC) has occurred in the plurality of memory cells MC, in which case the controller 120 does not execute further error correction on the plurality of memory cells MC.

In embodiments of the present disclosure, the early termination condition may be determined in various ways.

For example, when the number of error bits when executing the first error correction decoding on the plurality of memory cells MC is greater than or equal to a preset threshold number of bits (e.g., N times the maximum correctable number of bits), the controller 120 may determine that the early termination condition is satisfied.

As another example, the controller 120 may determine that the early termination condition is satisfied when threshold voltage distributions of the plurality of memory cells MC are abnormal distributions.

The controller 120 may determine whether the threshold voltage distributions of the plurality of memory cells MC are abnormal distributions as follows.

For example, in the process of executing the first error correction decoding, the controller 120 may calculate the number of memory cells in an erased state from among the plurality of memory cells MC, and calculate the number of memory cells in a first program state through an N-th (where N is a natural number) program state. The controller 120 may determine that the threshold voltage distributions of the plurality of memory cells MC are abnormal distributions when the number of memory cells in an erased state is less than or equal to a first reference value, or when the number of memory cells in one of the first program state through N-th program state is less than or equal to a second reference value.

As another example, the controller 120 may determine that the threshold voltage distributions of the plurality of memory cells MC are abnormal distributions when the optimal read voltage determined in the process of executing the first error correction decoding is not included in a preset voltage range.

When the early termination condition is not satisfied (S530-N), the controller 120 may execute the second error correction decoding (S520).

On the other hand, when the early termination condition is satisfied (S530-Y), the controller 120 may not execute the second error correction decoding (S540). At this time, the controller 120 may determine that an uncorrectable error has occurred during a read operation on the plurality of memory cells MC.

The storage device 100 may determine whether to execute the second error correction decoding according to the methods described in FIG. 5 for the following reasons.

In a state where the early termination flag is set and the early termination condition is satisfied, the probability that errors are correctable may be extremely low even if the controller 120 additionally executes error correction decoding on data read from the plurality of memory cells MC.

Therefore, when the controller 120 quickly determines that an uncorrectable error has occurred, latency of a read operation can be decreased rather than executing additional error correction decoding.

Figure 6:
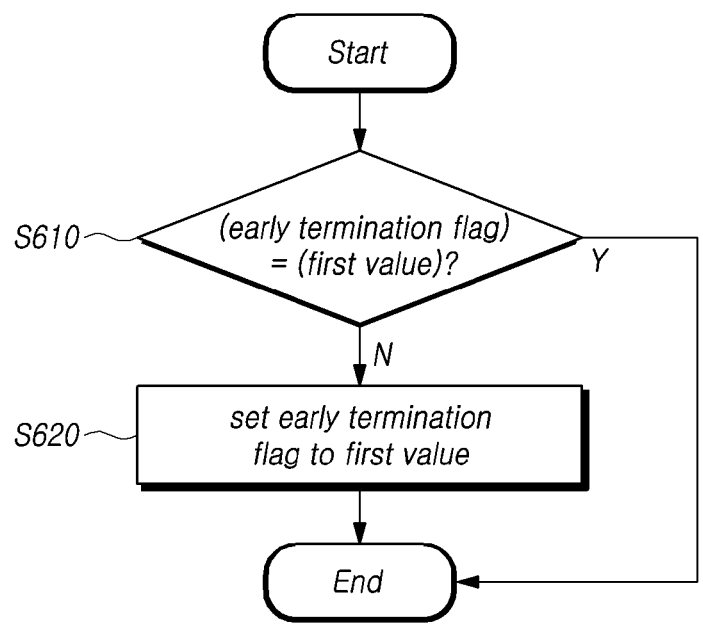
FIG. 6 is a flowchart illustrating an operation executed by a storage device when a second error correction decoding fails, according to an embodiment of the disclosure.

In embodiments of the present disclosure, the controller 120 may operate differently based on whether the second error correction decoding executed in the operation S520 succeeds or fails. In FIG. 6, an operation of the controller 120 when the second error correction decoding fails will be described.

FIG. 6 is a flowchart illustrating an operation executed by a storage device when a second error correction decoding fails, according to an embodiment of the disclosure.

In embodiments of the present disclosure, a controller 120 of a storage device 100 determines whether a value of an early termination flag is a first value (S610).

When the value of the early termination flag is not the first value (S610-N), the controller 120 may set the early termination flag to the first value (S620).

On the other hand, when the value of the early termination flag is the first value (S610-Y), the controller 120 may not execute a separate operation for the early termination flag because the value of the early termination flag is already the first value.

As a result, the controller 120 may set the early termination flag to the first value when the second error correction decoding fails.

An operation executed when the storage device 100 determines that an uncorrectable error has occurred without executing the second error correction decoding, or when the second error correction decoding fails after the first error correction decoding fails, has been described above.

Hereinafter, an operation executed by the storage device 100 when the first error correction decoding executed in the operation S410 is successful, or the second error correction decoding executed in the operation S520 is successful, will be described.

Figure 7:
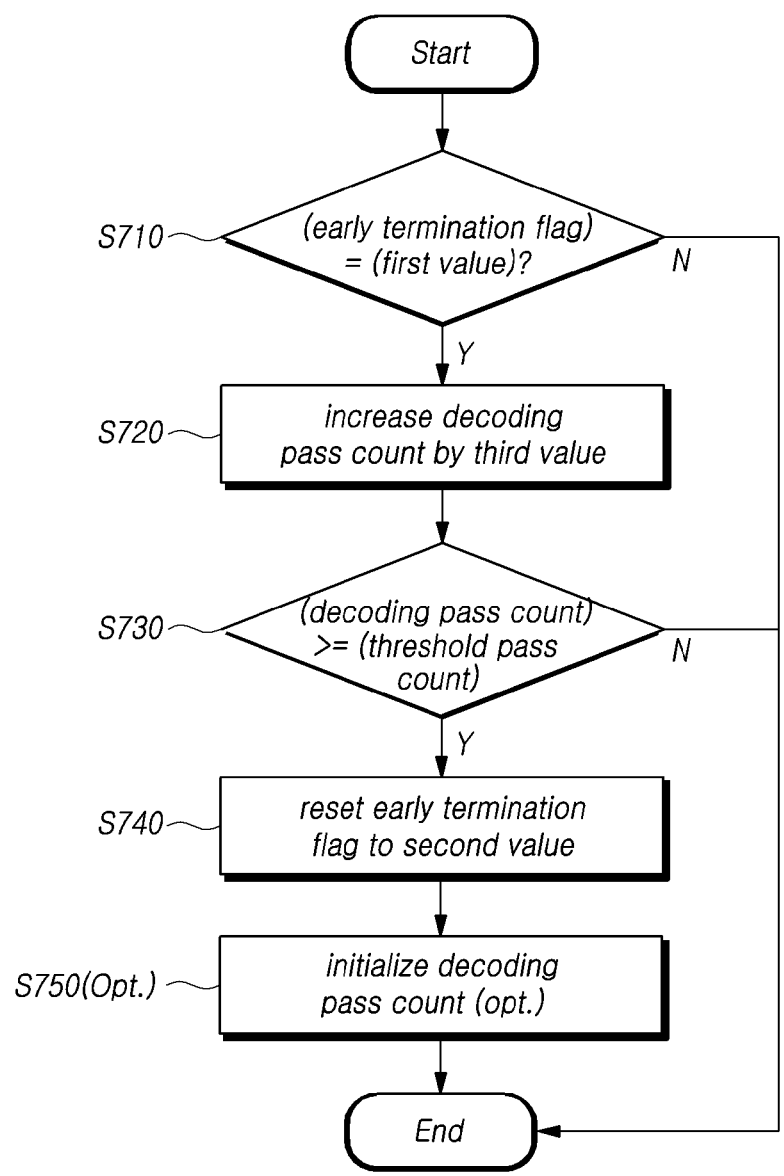
FIG. 7 is a flowchart illustrating an operation executed by a storage device when the first error correction decoding or the second error correction decoding succeeds, according to an embodiment of the disclosure.

FIG. 7 is a flowchart illustrating an operation executed by a storage device when the first error correction decoding or the second error correction decoding succeeds, according to an embodiment of the disclosure.

Referring to FIG. 7, a controller 120 of a storage device 100 may determine whether a value of an early termination flag is a first value (S710).

When the early termination flag is the first value (S710-Y), the controller 120 may increase a decoding pass count by a third value (e.g., increment by 1) (S720).

The decoding pass count is a value indicating the number of times error correction decoding has been successful in a process in which the storage device 100 previously executed a read operation. The controller 120 may increase the decoding pass count when the first error correction decoding or the second error correction decoding succeeds. In embodiments of the present disclosure, the decoding pass count may be used to determine whether to reset the early termination flag from the first value to the second value.

On the other hand, when the early termination flag is not the first value (S710-N), the controller 120 may not execute an additional operation. This is because the controller 120 does not need to use the decoding pass count since the early termination flag has already been reset to the second value.

In embodiments of the present disclosure, the controller 120 may determine whether to reset the early termination flag to the second value based on the increased decoding pass count.

Specifically, the controller 120 may determine whether the decoding pass count is greater than or equal to a set threshold pass count (e.g., 10) after increasing the decoding pass count in the operation S720 (S730).

When the decoding pass count is greater than or equal to the threshold pass count (S730-Y), the controller 120 may reset the early termination flag to the second value (S740).

When the decoding pass count is equal to or greater than the threshold pass count, it means that the frequency of successful error correction decoding during previously executed read operations is high, and it means that the probability is high that successful error correction decoding will be performed thereafter.

Therefore, in this case, it is preferable that the controller 120 generate original data by executing additional error correction decoding rather than determining that an uncorrectable error has occurred.

The controller 120 may selectively execute an operation of initializing the decoding pass count after executing the operation S740 (S750).

When the decoding pass count is less than the threshold pass count (S730-N), however, the controller 120 may not execute an additional operation.

Figure 8:
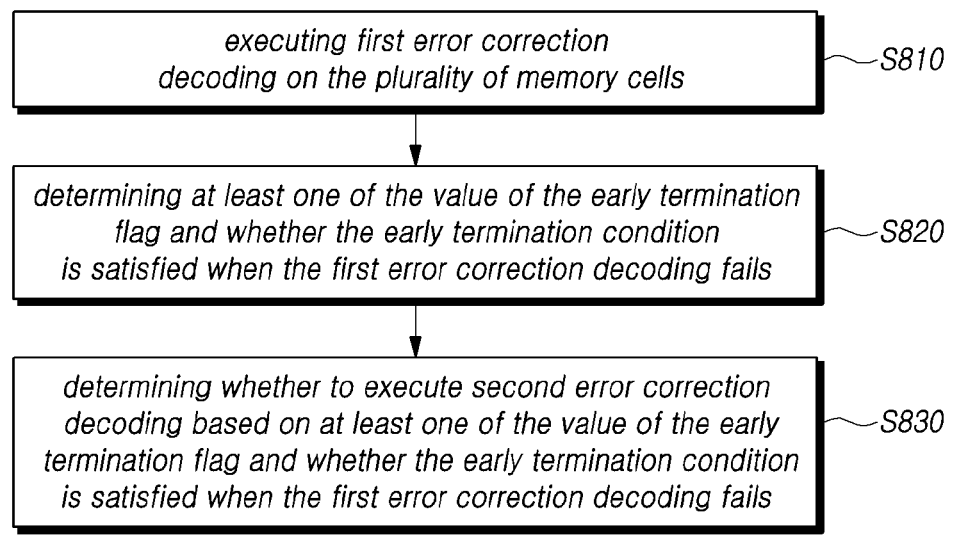
FIG. 8 is a diagram illustrating a method for operating a storage device according to an embodiment of the disclosure.

FIG. 8 is a diagram illustrating a method for operating a storage device according to an embodiment of the disclosure.

Referring to FIG. 8, a method for operating a storage device 100 may include executing a first error correction decoding on a plurality of memory cells MC when a read operation on the plurality of memory cells MC fails (S810).

The method for operating the storage device 100 may include determining at least one of (i) the value of the early termination flag and (ii) whether the early termination condition is satisfied when the first error correction decoding fails (S820).

The method for operating the storage device 100 may include determining whether to execute the second error correction decoding on the plurality of memory cells based on at least one of (i) the value of the early termination flag and (ii) whether the early termination condition is satisfied (S830).

The first error correction decoding may be a hard decision decoding based on first data read from the plurality of memory cells MC, and the second error correction decoding may be a soft decision decoding based on the first data and probability information on the first data.

For example, the operation S830 may determine not to execute the second error correction decoding when the early termination flag is a first value and the early termination condition is satisfied. The operation S830 may determine to execute the second error correction decoding when the early termination flag is the first value and the early termination condition is not satisfied, or when the early termination flag is a second value.

The method for operating the storage device 100 may further include setting the early termination flag to the first value when the second error correction decoding fails.

The method for operating the storage device 100 may further include determining whether the early termination flag is the first value when the first error correction decoding succeeds or the second error correction decoding succeeds, and determining whether to increase a decoding pass count by a third value and to reset the early termination flag to the second value based on the decoding pass count when the early termination flag is the first value.

The determining whether to reset the early termination flag to the second value may reset the early termination flag to the second value when the decoding pass count is greater than or equal to a set threshold pass count. In this case, the method for operating the storage device 100 may further include initializing the decoding pass count when resetting the early termination flag to the second value.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of memory cells; and
a controller configured to:
execute first error correction decoding on the plurality of memory cells when a read operation on the plurality of memory cells fails,
determine, when the first error correction decoding fails, whether to execute second error correction decoding on the plurality of memory cells based on at least one of a value of an early termination flag and whether an early termination condition is satisfied,
wherein the controller is configured not to execute the second error correction decoding when the early termination flag is a first value and the early termination condition is satisfied, and
to execute the second error correction decoding when the early termination flag is the first value and the early termination condition is not satisfied, or when the early termination flag is a second value.

2. The storage device according to claim 1, wherein
the first error correction decoding is hard decision decoding based on first data read from the plurality of memory cells, and
the second error correction decoding is soft decision decoding based on the first data and probability information on the first data.

3. The storage device according to claim 1,
wherein the controller is configured to set the early termination flag to the first value when the second error correction decoding fails.

4. The storage device according to claim 1,
wherein the controller is configured
to determine whether the early termination flag is the first value when the first error correction decoding succeeds or the second error correction decoding succeeds, and
to increase a decoding pass count by a third value and reset the early termination flag to the second value based on the decoding pass count when the early termination flag is the first value.

5. The storage device according to claim 4,
wherein the controller is configured to reset the early termination flag to the second value when the decoding pass count is greater than or equal to a threshold pass count.

6. The storage device according to claim 5,
wherein the controller is configured to initialize the decoding pass count when resetting the early termination flag to the second value.

7. A method for operating a storage device, comprising:
executing first error correction decoding on a plurality of memory cells when a read operation on the plurality of memory cells fails;
determining at least one of a value of an early termination flag and whether an early termination condition is satisfied when the first error correction decoding fails; and
determining whether to execute second error correction decoding on the plurality of memory cells based on at least one of the value of the early termination flag and whether the early termination condition is satisfied,
wherein the determining whether to execute the second error correction decoding does not execute the second error correction decoding when the early termination flag is a first value and the early termination condition is satisfied, and executes the second error correction decoding when the early termination flag is the first value and the early termination condition is not satisfied, or when the early termination flag is a second value.

8. The method according to claim 7, wherein
the first error correction decoding is hard decision decoding based on first data read from the plurality of memory cells, and
the second error correction decoding is soft decision decoding based on the first data and probability information on the first data.

9. The method according to claim 7, further comprising:
setting the early termination flag to the first value when the second error correction decoding fails.

10. The method according to claim 7, further comprising:
determining whether the early termination flag is the first value when the first error correction decoding succeeds or the second error correction decoding succeeds; and
determining whether to increase a decoding pass count by a third value and reset the early termination flag to the second value based on the decoding pass count when the early termination flag is the first value.

11. The method according to claim 10,
wherein the determining whether to reset the early termination flag to the second value resets the early termination flag to the second value when the decoding pass count is greater than or equal to a threshold pass count.

12. The method according to claim 11, further comprising:
initializing the decoding pass count when resetting the early termination flag to the second value.

13. A controller comprising:
a memory interface capable of communicating with a memory including a plurality of memory cells; and
a control circuit configured to:
execute hard decision decoding on the plurality of memory cells when a read operation on the plurality of memory cells fails,
execute soft decision decoding on the plurality of memory cells or determining that an uncorrectable error has occurred when the hard decision decoding fails, and
reset an early termination flag when the hard decision decoding succeeds or the soft decision decoding succeeds,
wherein the control circuit is configured not to execute the soft decision decoding when the early termination flag is a first value and an early termination condition is satisfied, and
to execute the soft decision decoding when the early termination flag is the first value and the early termination condition is not satisfied, or when the early termination flag is a second value.

* * * * *